United States Patent
Benhase et al.

(10) Patent No.: US 9,285,998 B2
(45) Date of Patent: *Mar. 15, 2016

(54) TIERED CACHING AND MIGRATION IN DIFFERING GRANULARITIES

(71) Applicant: INTERNATIONAL BUSINESS MACHINES CORPORATION, Armonk, NY (US)

(72) Inventors: Michael T. Benhase, Tucson, AZ (US); Lokesh M. Gupta, Tucson, AZ (US); Cheng-Chung Song, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,532

(22) Filed: Jun. 22, 2015

(65) Prior Publication Data
US 2015/0286418 A1 Oct. 8, 2015

Related U.S. Application Data

(63) Continuation of application No. 13/746,951, filed on Jan. 22, 2013, now Pat. No. 9,037,791.

(51) Int. Cl.
G06F 13/10 (2006.01)
G06F 3/06 (2006.01)
G06F 12/08 (2006.01)

(52) U.S. Cl.
CPC ............ *G06F 3/0611* (2013.01); *G06F 3/0644* (2013.01); *G06F 3/0649* (2013.01); *G06F 3/0685* (2013.01); *G06F 12/0802* (2013.01); *G06F 12/0806* (2013.01); *G06F 12/0866* (2013.01); *G06F 12/0868* (2013.01); *G06F 12/0897* (2013.01); *G06F 2003/0691* (2013.01); *G06F 2003/0692* (2013.01); *G06F 2003/0698* (2013.01); *G06F 2212/1024* (2013.01); *G06F 2212/205* (2013.01);
(Continued)

(58) Field of Classification Search
CPC .. G06F 12/0866; G06F 3/0611; G06F 3/0644
USPC ........................................................ 711/113
See application file for complete search history.

(56) References Cited

U.S. PATENT DOCUMENTS 5,778,210 A 7/1998 Henstrom et al.
6,065,019 A 5/2000 Ault et al.
(Continued)

FOREIGN PATENT DOCUMENTS

| CN | 101101563 A | 1/2008 |
|---|---|---|
| CN | 102831088 A | 12/2012 |
| JP | 2010092222 | 4/2010 |

*Primary Examiner* — Jae Yu
(74) *Attorney, Agent, or Firm* — Griffiths & Seaton PLLC

(57) ABSTRACT

For data processing in a distributed computing storage environment by a processor device, the distributed computing environment incorporating at least high-speed and lower-speed caches, and managed tiered levels of storage, groups of data segments and clumped hot ones of the data segments are migrated between the tiered levels of storage such that uniformly hot ones of the groups of data segments are migrated to use a Solid State Drive (SSD) portion of the tiered levels of storage; uniformly hot groups of data segments are determined using a first, largest granulated, heat map for a selected one of the group of the data segments; and a second heat map, which is smaller than the first and having the largest granularity of the first heat map, is used to determine the clumped hot groups.

21 Claims, 6 Drawing Sheets

(52) U.S. Cl.
CPC .... *G06F 2212/217* (2013.01); *G06F 2212/254* (2013.01); *G06F 2212/261* (2013.01); *G06F 2212/284* (2013.01); *G06F 2212/608* (2013.01)

(56) References Cited

U.S. PATENT DOCUMENTS

| | | |
|---|---|---|
| 6,981,096 B1 | 12/2005 | Matick et al. |
| 7,986,543 B2 | 7/2011 | Emma |
| 8,615,678 B1 * | 12/2013 | Madnani et al. ............... 714/5.1 |
| 2005/0240821 A1 | 10/2005 | Martin |
| 2006/0123206 A1 | 6/2006 | Barrett et al. |
| 2007/0245090 A1 | 10/2007 | King et al. |
| 2010/0211756 A1 | 8/2010 | Kaminski et al. |
| 2010/0235582 A1 * | 9/2010 | Factor et al. .................. 711/133 |
| 2012/0072578 A1 | 3/2012 | Alam |
| 2012/0102350 A1 | 4/2012 | Belluomini et al. |
| 2012/0117349 A1 | 5/2012 | Lau et al. |
| 2012/0137061 A1 | 5/2012 | Yang et al. |
| 2012/0331222 A1 | 12/2012 | Jibbe et al. |

* cited by examiner

TIERED CACHING AND MIGRATION IN DIFFERING GRANULARITIES

CROSS-REFERENCE TO RELATED APPLICATIONS

This application is a Continuation of U.S. patent application Ser. No. 13/746,951, filed on Jan. 22, 2013.

BACKGROUND OF THE INVENTION

1. Field of the Invention

The present invention relates generally to computers, and more particularly, to mechanisms for migrating and caching data segments in a computing storage environment.

2. Description of the Related Art

In today's society, computer systems are commonplace. Computer systems may be In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

SUMMARY OF THE DESCRIBED EMBODIMENTS

Various exemplary method, system, and computer program product embodiments for data processing in a distributed computing storage environment by a processor device, the distributed computing storage environment incorporating at least high-speed and lower-speed caches, and tiered levels of storage, are provided. In one embodiment, by way of example only, the method comprises migrating groups of data segments between the tiered levels of storage such that uniformly hot ones of the groups of data segments and clumped hot ones of the data segments are migrated to use a Solid State Drive (SSD) portion of the tiered levels of storage; determining the uniformly hot groups of data segments using a first heat map for a selected one of the group of the data segments, the heat map having a first, largest granularity; and determining the clumped hot groups of data segments using a second heat map having a granularity smaller than the first, largest granularity of the first heat map.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
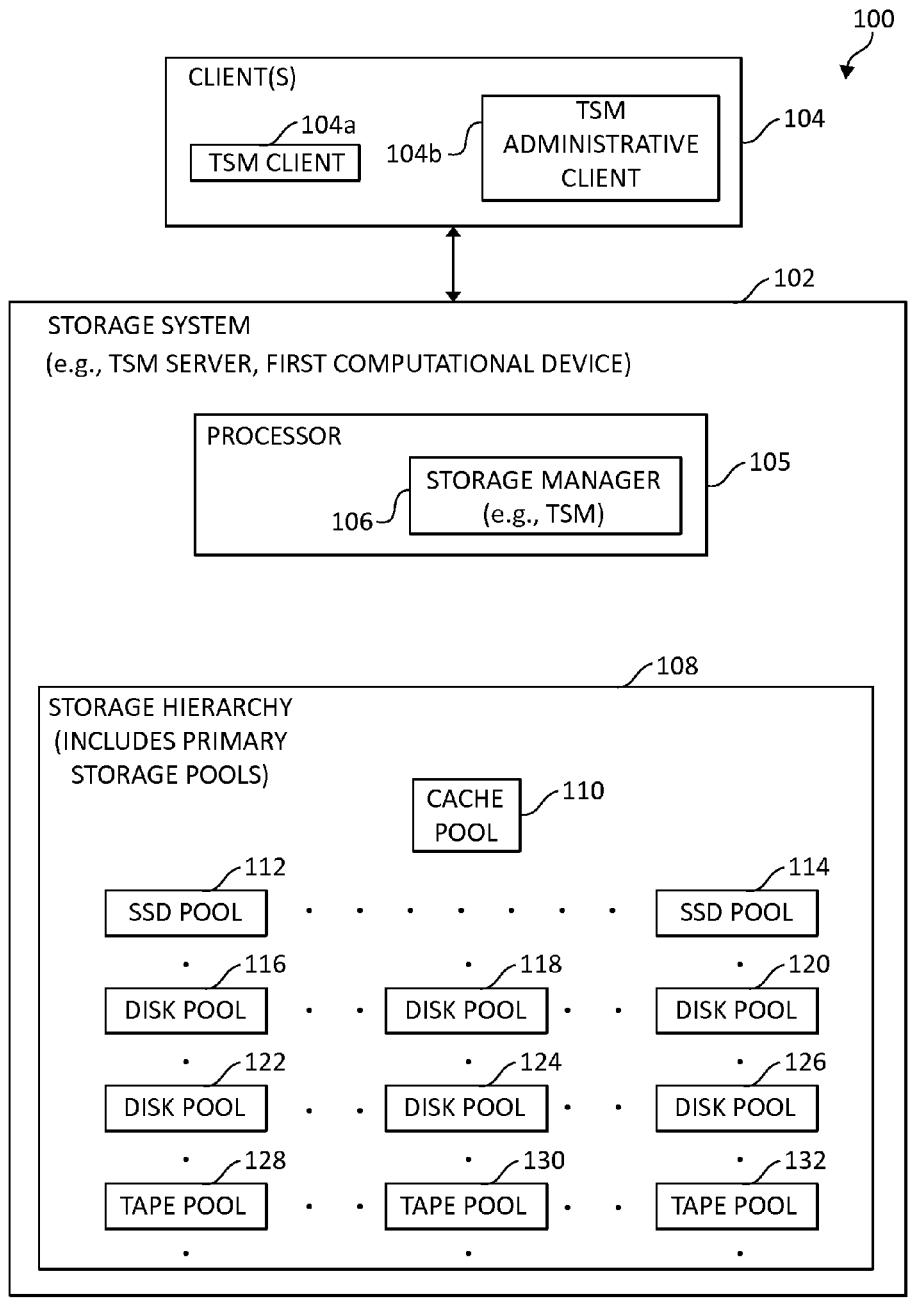
FIG. 1 is a high-level block diagram showing an exemplary tiered storage environment in which mechanisms in accordance with the present invention may be implemented.

Caches may be provided as multi-level caches. For example, a caching system may include both a "primary" and "secondary" cache. When reading data, a computing system or device may first look for data in the primary cache and, if the data is absent, look for the data in the secondary cache. If the data is not in either cache, the computing system or device may retrieve the data from disk drives or other storage devices. When writing data, a computing system or device may write data to the primary cache. This data may eventually be destaged to the secondary cache or a storage device to make room in the primary cache.

Storage environments in computer systems may include so-called tiered storage architectures, which may include a variety of storage mediums such as enterprise hard disk drives (HDD), serial advanced technology attachment (SATA) disk drives, solid state drives (SSD), tape drives, and other devices. Data may be migrated between such devices. Placement of certain kinds of data in the appropriate medium may greatly enhance overall performance of the storage environment.

In such tiered storage architectures, an improvement may be implemented such that certain data segments may be migrated using the tiered storage mechanisms, while others may utilize the secondary cache, or vice versa, or both. In this manner, the overall performance of the storage environment may be further enhanced.

In such tiered storage architectures making use of the aforementioned "hybrid" migration and caching mechanisms, a need arises for an effective means for accommodation of the various storage organizations (volumes, pools, etc.) between caches and tiered storage architectures for optimal performance when large "clumps" of data become "hot."

In one exemplary tiered storage environment, migration of data segments may typically be operational on a large granularity. To this end, large (e.g., 1 GigaByte (GB)) blocks of data are migrated, based at least partly on statistics gathered over large intervals. In such a tiered system, a data segment may be migrated if the extent is determined to be "hot" (e.g., a large number of hits due to reads or writes to the data segment).

Alternatively, in contrast to large granularity operations conducted by tiered mechanisms, the secondary cache or "Flash Cache" may operate on data segments in a smaller granularity (e.g., a track of 64 KiloBytes (KB)), and caches tracks on flash memory when the tracks are demoted from the primary (i.e., Dynamic Read Only Memory (DRAM)) cache.

While tiered storage may be beneficial for caching uniformly hot data and "flash Cache" beneficial for caching sparsely hot data, some situations may arise where large clumps of data segments may be hot. A need exists for a mechanism whereby such a scenario is effectively accommodated.

To achieve such accommodation, the illustrated embodiments provide mechanisms for adding an additional tier of storage for caching and migration and sharing data segments between tiered storage (large granularity), tiered storage (medium granularity), and Flash Cache (small granularity).

In addition, the illustrated embodiments provide mechanisms for using heat maps acting on these differing granularities to provide a determination vehicle for migration and caching of data segments in a computing storage environment to provide optimal performance as will be further described. Data segments are examined in this heat map context to determine whether they are "uniformly," "clumped," or "sparsely" hot as will be further illustrated. Differing caching and migration mechanisms are then applied to those data segments determined to be uniformly hot, those determined to be clumped hot, and those determined to be sparsely hot.

Turning now to FIG. 1, in accordance with certain embodiments a block diagram of a tiered computing storage environment 100 is illustrated. The computing storage environment 100 includes a first computational device, such as, a storage system 102, coupled to one or more computational devices, such as, clients 104. In certain embodiments, the storage system 102 and the clients 104 may comprise any suitable computational device, including those presently known in the art, such as, a personal computer, a workstation, a mainframe, a midrange computer, a network appliance, a palm top computer, a telephony device, a blade computer, a hand held computer, etc.

In some embodiments, a storage manager 106, such as, the Tivoli® Storage Manager® (TSM) product marketed by International Business Machines (IBM®) Corporation, may be used for securely storing and managing data segments according to aspects of the present invention. The storage manager 106 may execute in a storage management server, such as a TSM server 102 or elsewhere. In one embodiment, the storage manager is operable by and/or in conjunction with processor device 105 as shown. One of ordinary skill in the art will appreciate that various other configurations of the processor 105, storage manager 106, and related additional processing and/or memory components are contemplated. IBM, Tivoli, and Tivoli Storage Manager are trademarks or registered trademarks of IBM Corporation.

The TSM may provide data storage services to clients, such as TSM clients 104a, for management of data. The TSM server 102 may store files sent to the TSM server 102 by one or more TSM clients 104a, 104b. The storage manager 106 and/or processor device 105 may allow a system administrator to configure storage pools, where a storage pool comprises a group of devices used for storing data received from the TSM clients 104a, 104b. Storage pools are used as targets for store operations from the TSM clients 104a, 104b, and are referenced in TSM server policies and other constructs for processing.

As shown, a variety of storage devices may be organized into a storage hierarchy. Storage media within the storage hierarchy may thus be grouped into data structures referred to herein as storage pools. The storage hierarchy may be organized to correspond with one or more metrics, such as a performance metric including write or read speeds. The storage hierarchy 108 as shown may be organized such that the top of the hierarchy may include a cache pool 110 having a highest amount or quality of a particular performance metric. Below the cache pool 110, a number of solid state drive (SSD) class devices may be organized into SSD pools by the same, similar, or other metrics (e.g., SSD pools 112 and 114).

In accordance with the mechanisms of the illustrated embodiments, the particular performance metric may be tied to so-called "heat maps" (not shown for purposes of convenience) that indicate Whether data segments in small, medium, or large granularities are a certain characteristic as will be further described. In one embodiment, this characteristic may be termed "uniformly hot," "clumped hot" or "sparsely hot," again as will be further described.

Below the SSD pools 112 and 114, a first tier of disk pools (e.g., disk pools 116, 118, and 120) may be then organized. As one of ordinary skill in the art will appreciate, disk pools 116, 118, and 120 may include a variety of disk devices such as pools of enterprise disk drives, SATA disk drives, disk devices configured in a particular redundant array of independent disks (RAID) configuration, and the like.

The first tier of disk pools may be located above a second tier of disk pools (e.g., pools 122, 124, and 126) by virtue of exhibiting a greater amount, stronger attribute or attributes, or quality of the performance metric. Below the second tier of disk pools, an additional tier of tape pools (e.g., tape pools 128, 130, and 132) may then be organized. Various considerations for the organization of such storage hierarchies 108 may be apparent to one of ordinary skill in the art. In one embodiment, the system administrator may assist in performing such configurations in the storage hierarchy 108 by inputs to the TSM administrative client 104b or another mechanism. While tape pools 128, 130, and 132 are shown within the storage hierarchy 108 as shown, it should be noted that generally such tape pools are found in a storage subsystem external to those pools ranking higher in the hierarchy.

Figure 2:
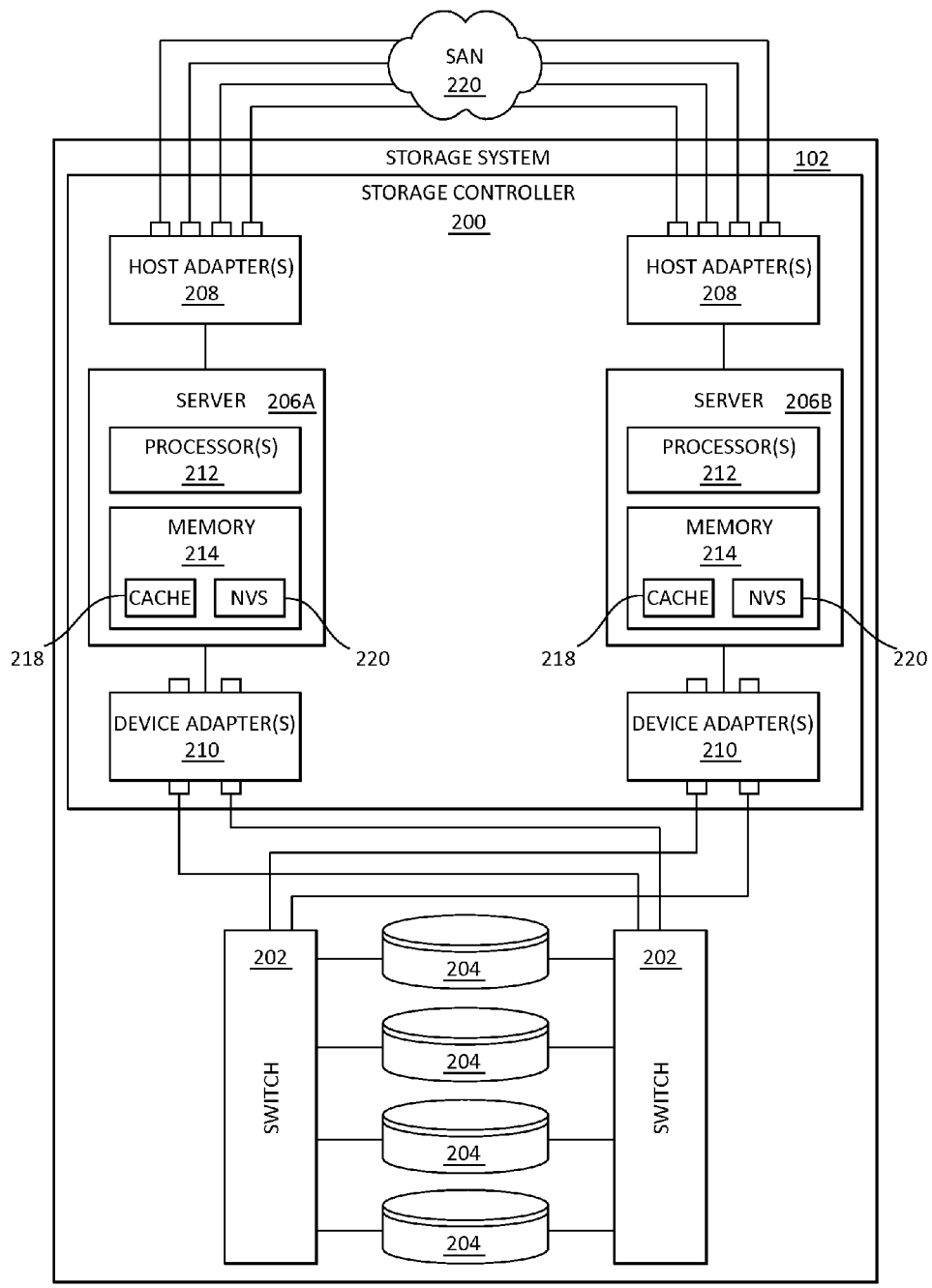
FIG. 2 is a high-level block diagram showing an exemplary storage system in which mechanisms in accordance with the present invention may be implemented.

Referring to FIG. 2, one embodiment of a storage system 102 containing an array of hard-disk drives 204 and/or solid-state drives 204 is illustrated. The internal components of the storage system 102 are shown since the caching system may, in certain embodiments, be implemented within such a storage system 102, although the caching system may also be applicable to other storage systems 102. As shown, the storage system 102 includes a storage controller 200, one or more switches 202, and one or more storage devices 204 such as hard disk drives 204 or solid-state drives 204 (such as flash-memory-based drives 204). The storage controller 200 may enable one or more clients 104 (e.g., open system and/or mainframe servers 104) to access data in the one or more storage devices 204. The clients 104 (e.g., FIG. 1) may be accessible through a Storage Area Network (SAN) 220 as shown.

In selected embodiments, the storage controller 200 includes one or more servers 206. The storage controller 200 may also include host adapters 208 and device adapters 210 to connect the storage controller 200 to host devices 106 and storage devices 203, 204, respectively. Multiple servers 206a, 206b may provide redundancy to ensure that data is always available to connected hosts 106. Thus, when one server 206a fails, the other server 206b may remain functional to ensure that I/O is able to continue between the clients 104 and the storage devices 204. This process may be referred to as a "failover."

One example of a storage system 102 having an architecture similar to that illustrated in FIG. 2 is the IBM® DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the caching system disclosed herein is not limited to the IBM® DS8000™ enterprise storage system, but may be implemented in any comparable or analogous storage system 110, regardless of the manufacturer, product name, or components or component names associated with the system 110. Furthermore, any system that could benefit from one or more embodiments of the invention is deemed to fall within the scope of the invention. Thus, the IBM® DS8000™ is presented only by way of example and is not intended to be limiting.

In selected embodiments, each server 206 may include one or more processors 212 (e.g., n-way symmetric multiprocessors) and memory 214. The memory 214 may include volatile memory RAM) as well as non-volatile memory (e.g., ROM, EPROM, EEPROM, hard disks, flash memory, etc.). The volatile memory and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 may include a cache 218. Whenever a client 104 (e.g., an open system or mainframe server 104) performs a read operation, the server 206 that performs the read may fetch data from the storages devices 204 and save it in its cache 218 in the event it is required again. If the data is requested again by a client 104, the server 206 may fetch the data from the cache 218 instead of fetching it from the storage devices 204, saving both time and resources. Similarly, when a client 104 performs a write, the server 106 that receives the write request may store the write in its cache 218, and destage the write to the storage devices 204 at a later time. When a write is stored in cache 218, the write may also be stored in non-volatile storage (NVS) 220 of the opposite server 206 so that the write can be recovered by the opposite server 206 in the event the first server 206 fails.

Figure 3:
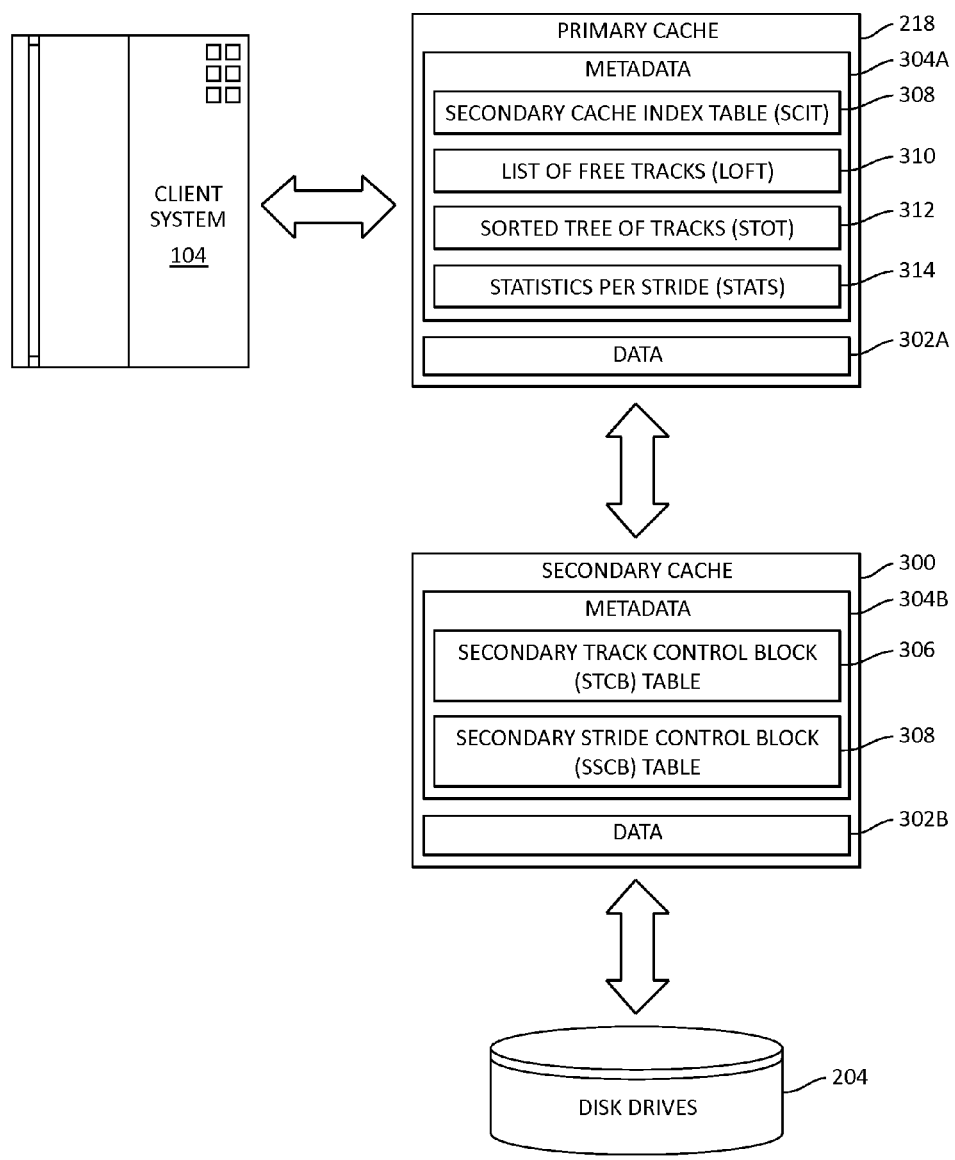
FIG. 3 is a high-level block diagram showing one embodiment of a multi-level cache in accordance with the invention.

Referring to FIG. 3, while continuing to refer generally to FIG. 2, as previously mentioned, a storage system 102 may include both hard disk drives 204 and solid-state drives (SSDs) 204, such as flash-memory-based drives 204. The I/O performance of SSDs 204 or other types of solid-state memory is typically far higher than the I/O performance of hard disk drives 204. Because of the higher I/O performance, the solid-state drives 204 may, in certain embodiments, be used to provide a large secondary cache 300 between the primary cache 218 and the hard disk drives 204. This large secondary cache 300 may significantly improve the I/O performance of the storage system 102, and may be referred to herein as "Flash Cache." Herein, the primary cache may be referred to as a high-speed or higher-speed cache (as it typically has access to the fastest Dynamic Read Only Memory or DRAM architectures), and the secondary, Flash Cache may be referred to as a low-speed or lower-speed cache (in comparison to the primary, DRAM cache), although this terminology is not intended to be limiting in any way.

Using the secondary cache 300, if a read request is received by a server 206 (e.g., FIG. 2), the server 206 may initially look for data in the primary cache 218 and, if the data is not present, look for the data in the secondary cache 300 (residing in the solid-state drives 204). If the data is not available in either cache, the server 206 may retrieve the data from the disk drives 204. Similarly, when writing data, a server 206 may initially write the modified data to the primary cache 218. This modified data may eventually be destaged to the secondary cache 300 to make room in the primary cache 218. This data may then be destaged to the disk drives 204 to make space in the secondary cache 300, as needed.

In certain embodiments, the secondary cache 300 may be sized to provide about one to twenty percent, or in other embodiments about five percent of the total storage capacity of the storage system 102. Thus, for a storage system 102 that contains about ten terabytes (TB) of storage (from both hard disk drives 204 and solid state drives 204), about 0.5 TB of this storage space may be used as a secondary, "Flash" cache 300. Such a large amount of secondary cache 300 may allow data to be destaged from the secondary cache 300 far less frequently than conventional primary or secondary caches. As an example, a very large secondary cache 300 could store writes for an entire day without having to destage the writes to the disk drives 204. The writes could then be destaged at night or during a period of relative inactivity. Cache management algorithms may be redesigned to efficiently utilize the additional space in the secondary cache 300 and take advantage of the performance improvements that are possible using a large secondary cache 300.

As shown in FIG. 3, each cache 218, 300 may store data 302a, 302b and metadata 304a, 304b. The data 302a, 302b may be stored in the form of tracks. Each track in the secondary cache 300 may have a secondary track control block (STCB) associated therewith. The STCB may also be referred to herein as Cache Flash Control Block (CFCB). Along with other information, the STCB for each track may include a pointer to the next track in the chain, information indicating whether the track is free or in-use, as well as information indicating which sectors in the track have been modified. In certain embodiments, the STCBs for all the tracks may be stored in an STCB table 306 stored in the secondary cache 300 as shown, or elsewhere.

In addition, each track in the secondary cache 300 may have a secondary stride control block (SSCB) associated therewith. The SSCB, like the STCB may include diagnostic and/or statistical information, but instead relating to strides (groups of tracks) stored in the secondary cache 300. The SSCB may also be referred to herein as Cache Flash Element (CFE). In certain embodiments, the SSCBs for all the strides may be stored in an SSCB table 308 stored in the secondary cache 300 as shown, or elsewhere.

Similarly, the primary cache 218 may also store metadata 304a associated with the secondary cache 300. For example, the primary cache 218 may store a secondary cache index table (SCIT) 308 that provides a directory for tracks in the secondary cache 300. En certain embodiments, the SCIT 308 is essentially a hash table with a constant hash function. To locate a specific track in the SCIT 308, the hash function may convert a track identifier (e.g., a track number) to a hash value. This hash value may then be looked up in the SCIT 308 to find the STCB for the track. Alternatively, the SOT 308 could be incorporated into a cache directory of the primary cache 218, thereby providing a single hash table that stores tracks for both the primary and secondary caches 218, 300. In selected embodiments, the SCIT 308 is kept exclusively in the primary cache 218. The SCIT 308 may be built or rebuilt (in the event of a failover, failback, or initial microcode load (IML)) by reading the STCB table 306 in the secondary cache 300.

In certain embodiments, the primary cache 218 may also store a list of free tracks (LOFT) 310 that indicates which tracks in the secondary cache 300 are free (i.e., unoccupied). This list 310 may be used to locate free space in the secondary cache 300 in order to destage data from the primary cache 218 to the secondary cache 300. In selected embodiments, inserting or removing tracks from the LOFT 310 may be performed in a log-structured manner. For example, tracks may be inserted at the end of the LOFT 310 and deleted from the front of the LOFT 310. The LOFT 310 may be kept exclusively in the primary cache 218 and may be built or rebuilt by reading the STCB table 306 in the secondary cache 300.

The primary cache 218 may also store a sorted tree of tracks (STOT) 312 that sorts the tracks by "trackid" or some other indicator. The STOT 312 may be used to minimize seek time (on the disk drives 204) when destaging tracks from the secondary cache 300 to the disk drives 204. The STOT 312 may be kept exclusively in the primary cache 218 and may be built or rebuilt by reading the STCB table 306 in the secondary cache 300.

The primary cache 218 may also store statistics per stride (STATS) 314 for each stride having one or more tracks in the secondary cache 300. A "stride" refers to a set of logically sequential data that might be segmented across multiple disks combined with additional parity information as is for example used in a RAID-5 (redundant array of inexpensive disks) configuration. In general, the STATS 314 may be used to determine which tracks require the least number of disk operations ("disk ops") to destage from the secondary cache 300 to the disk drives 204. In general, the destage penalty for a track will be less where more tracks are present in a stride. When selecting tracks to destage, tracks requiring the least number of disk ops may be destaged first to minimize resource utilization. In selected embodiments, the STATS 314 may store information such as the number of tracks that are present in the secondary cache 300 for each stride, and the number of disk ops required to destage a track in a stride. In certain embodiments; the STATS 314 may store a "recency" bit for each stride. The recency bit may be incremented each time an eviction process passes through a stride. The recency bit may be reset each time a track is added to a stride. The recency bit may be used to keep strides in the secondary cache 300 that are actively being written to. The STATS 314 may be kept exclusively in the primary cache 218 and may be built or rebuilt by reading the STCB table 306 in the secondary cache 300.

The metadata 304a, 304b described above may be structured and stored in various different ways and is not limited to the illustrated structure or organization. The metadata 304a, 304b is provided by way of example to show one technique for storing and structuring the metadata 304a, 304h. For example, in certain embodiments, the data and metadata may be stored together in the secondary cache 300 in a circular log-structured array. Other methods for structuring and storing metadata 304a, 304b may be used and are encompassed within the scope of the invention.

As previously mentioned, one advantage of a large secondary cache 300 is that data can be destaged from the secondary cache 300 far less frequently than conventional secondary caches. This may enable more data to accumulate in the secondary cache 300 before it is destaged to the disk drives 204. Accordingly, in selected embodiments, an apparatus and method in accordance with the invention may be configured to wait for full strides of data to accumulate and coalesce in the secondary cache 300 before the data is destaged to the disk drives 204. As explained above, this may minimize the number of disk ops required to destage data from the secondary cache 300 to the disk drives 204, thereby improving overall system performance.

Figure 4:
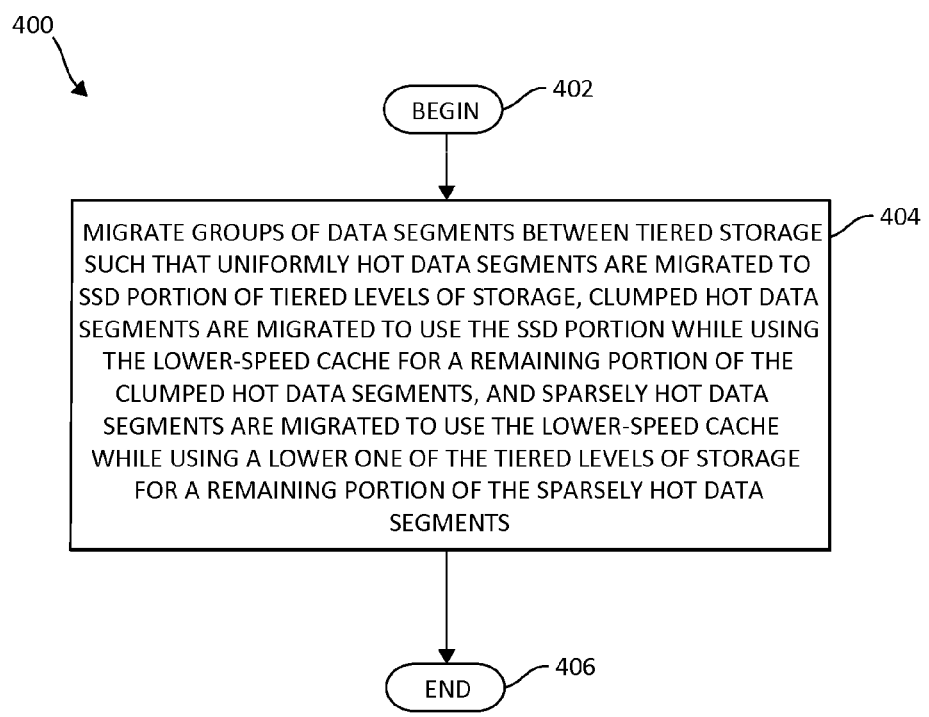
FIG. 4 is a flow chart diagram showing an exemplary method for thinly provisioning a storage volume for flash cache, while sharing an extent pool between flash cache and tiered storage architectures to improve storage migration performance, in accordance with one embodiment of the present invention.

Referring to FIG. 4, an exemplary method for thinly provisioning a lower-speed (e.g., "Flash Cache") (in contrast to use of a fixed-size auxiliary volume) while sharing data segments in varying granularities between the Flash Cache and several tiered levels of storage in a computing environment, is illustrated. In the illustrated embodiment, the secondary cache is represented as the lower-speed level of cache, and the higher speed cache may be implemented in the storage controller as DRAM cache as in a previous exemplary illustration. Method 400 begins (step 402). In one embodiment, the tiered storage architecture is configured to share a same storage (e.g., extent) pool with the lower-speed cache. In one embodiment, such a shared storage pool may include 1 GB extents of data segments. In lieu of using an auxiliary volume, the lower-speed level of cache is thinly provisioned (for example with a variable size and dynamic response to changing storage conditions). In one embodiment, the thinly provisioned lower-speed cache may grow or shrink by the aforementioned 1 GB blocks of data size, again depending on changing storage conditions in the environment.

Accordingly and in view of the foregoing, in step 404, groups of data segments are migrated between tiered storage such that uniformly hot data segments are migrated to a Solid State Device (SSD) portion of the tiered levels of storage, so-called "clumped hot" as will be further described data segments are migrated to use the SSD portion while using the lower-speed cache for a remaining portion of the clumped hot data segments, and sparsely hot data segments are migrated to use the lower-speed cache while using an even lower one of the tiered levels of storage for a remaining portion of the sparsely hot data segments. The method 400 then ends (step 406).

Method 400 may be further enhanced by use of differing granularity heat maps for the determining of which data segments are uniformly hot, clumped hot, and which are sparsely hot. For example, in one embodiment, a two-stage consideration may take place, where a selected data segment may be determined to be uniformly hot or clumped hot, for example, by first examining the large granularity (i.e., 1 GB blocks) heat map to determine if the large granularity heat map is hot, and if not, then examining the smaller granularity (such as a stride-by-stride comparison or KB blocks) heat map to determine if a certain number of those granular portions are hotter than a predetermined threshold. For example, in a certain extent, if more than 500 strides in a 1 GB extent are hot, the lower granularity heat map may be said to indicate that the extent is uniformly hot. Similarly, if a certain number above a predetermined threshold of sub-portions of the 1 GB extent are hot, again the extent may be deemed uniformly hot. Alternatively, if the heat map for the 1 GB extent is not hot, but at least one of the sub-portions of the data segment (e.g., 10 or 100 MB sub-extents) is hot, then the extent in question may be deemed clumped hot.

In similar fashion, to determine sparse hotness, the larger granularity heat map may first be consulted to determine a hotness above a predetermined threshold, and if not, the smaller granularity heat map may be used to determine if less than the predetermined number of granular portions are hotter than the predetermined threshold.

Figure 5:
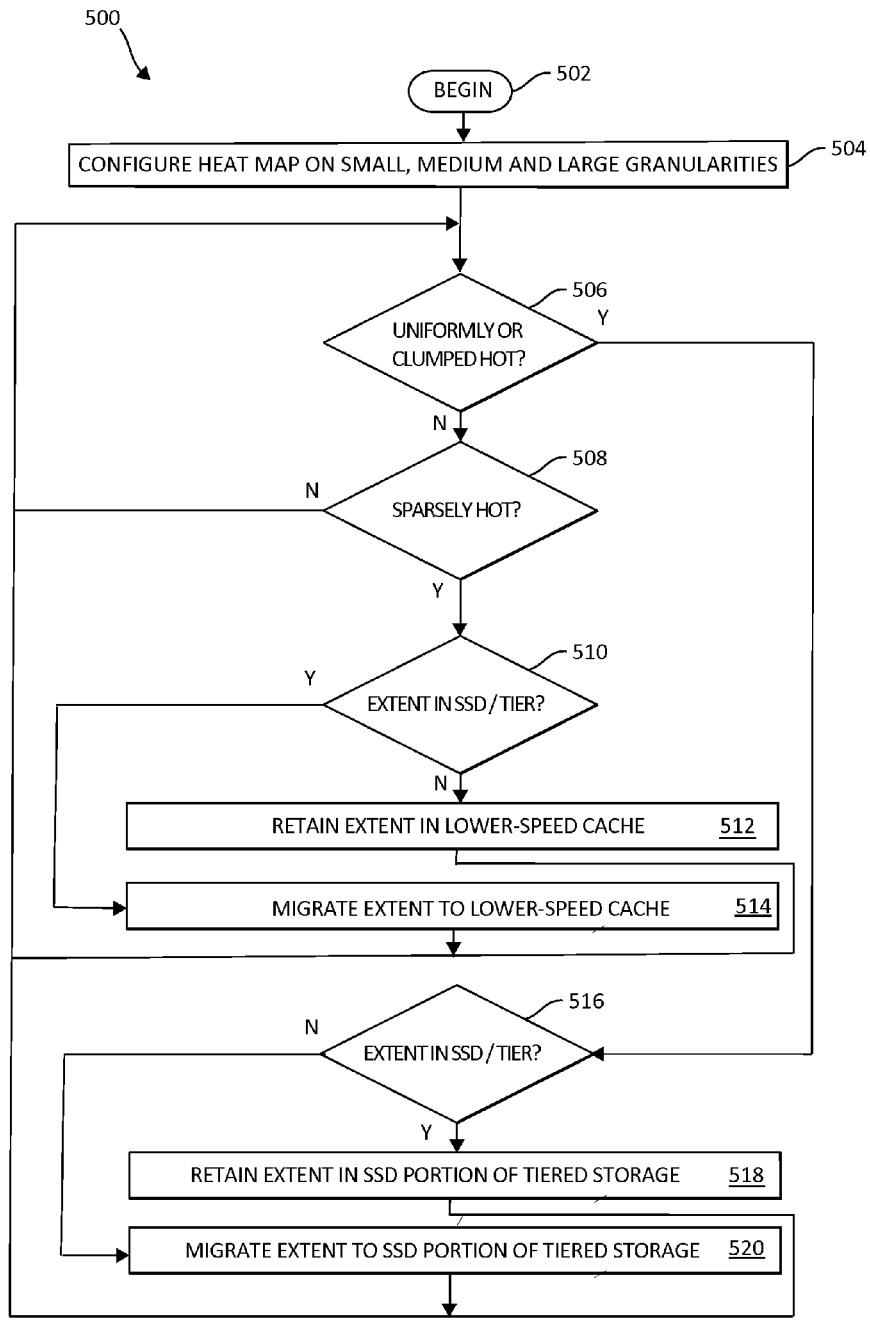
FIG. 5 is a flow chart diagram showing an exemplary method for using different granularity heat maps, in combination with flash cache and tiered storage architectures to improve storage migration performance, again in accordance with one embodiment of the present invention.

The determination of uniform hotness, clumped hotness, and/or sparse hotness can then be used to migrate data between flash cache and tiered storage architectures in accordance with the mechanisms of the present invention as will be further described and shown in FIG. 5, following.

FIG. 5 illustrates an additional exemplary method for data migration in accordance with mechanisms of the illustrated embodiments, taking into account uniform and sparse hotness that, for example, may be determined according to the previous description.

Method 500 begins (step 502) with the configuration of small, medium, and large granularity heat maps (step 504). In one embodiment, these heat maps may be configured on 1 GB extents for the larger granularity, medium size sub-extents (e.g., 10 or 100 MB portions) for the medium granularity, and an N number of disk blocks (such as a stride or 1 MB blocks) for the smaller granularity.

Consider the following exemplary embodiment. A certain Flash Cache may be configured with 1-128 block cache, level 2 (L2), an upper lower-speed cache may be configured with an upper tier having 10 MB copy SSD on L2, and a lower tier having 1 GB migrate HDD on L3. In such an example, 100× 10 MB (as opposed to 1 GB) blocks may be utilized on SSD storage for clumped hot 1 GB extents. For these blocks, uniformly hot segments may be cached in the SSD portion and/or migrated from Flash Cache, and said Flash Cache may be used to move the 1 GB extent to the SSD portion. In the case of sparse hot segments, Flash Cache may be used to cache such data, and/or migrated from the SSD portion. Finally, in the case of clumped hot segments, 10 MB blocks may be used in addition to the aforementioned 1 GB extents, and the Flash Cache (to the extent possible) may be used to cache these segments, with the remainder being migrated and/or cached in the SSD portion.

Returning to method 500, in step 506, a determination is made as to whether a selected extent is uniformly hot or clumped hot. As previously mentioned, in one embodiment, the extent may be determined to be uniformly hot if the heat map for the larger granularity is hot (i.e., hotter than a predetermined threshold), or/and alternatively, if at least M numbers of the low granularity N disk blocks are hot. And again as previously mentioned, in one embodiment, the extent may be determined to be clumped hot if the heat map for the large granularity is not hot, yet at least one of the sub-extent clumps (again perhaps 10 or 100 MB portions) is hot.

If the extent is determined to be uniformly hot or clumped hot, the method 500 moves to step 516, which queries if the uniformly hot/clumped hot extent is currently cached in the SSD portion of the tiered storage architecture (as opposed to the lower speed, Flash Cache, for example). If not, the entire hot extent, or the clumped hot sub-extent, is migrated (step 520) to the SSD portion of the tiered storage architecture, and the method returns to step 506. In one embodiment, the Flash Cache access (or data processing in any form of such cached data) to such migrated data is not disabled until the extent or sub-extent is completely migrated to the SSD portion, so as not to negatively effect performance.

Returning to step 516, if the extent is determined to be currently cached in the SSD portion, the extent/sub-extent(s) is retained in the SSD portion (step 518), and the method returns to step 506.

Returning to step 506, if the extent is determined not to be uniformly hot, the method 500 moves to step 508, which queries if the extent is sparsely hot. Here again, in one embodiment, the extent may be determined to be sparsely hot if the heat map for the larger granularity is not hot (i.e., not hotter than the predetermined threshold) or/and alternatively, if at least M numbers of the low granularity N disk blocks are not hot.

If the extent is not determined to be sparsely hot in step 508, the method returns to step 506 as shown. If the extent is determined to be sparsely hot, the method moves to step 510, which again queries if the extent is in the SSD portion of the tiered storage architecture (again, as opposed to the lower speed cache). If so, that portion of the extent determined to be sparsely hot is migrated using the SSD portion to the lower-speed cache (step 514), and the entire extent (or alternatively, in another embodiment, that portion of the extent not deemed to be sparsely hot) is migrated from SSD to HDD. The method 500 then returns to step 506 to query against another extent (or perhaps the same extent has now subsequently become uniformly hot). Returning to step 510, if the extent is determined to be currently cached in the SSD portion so, the extent is retained in the SSD portion (step 512), and the method returns to step 506.

Figure 6:
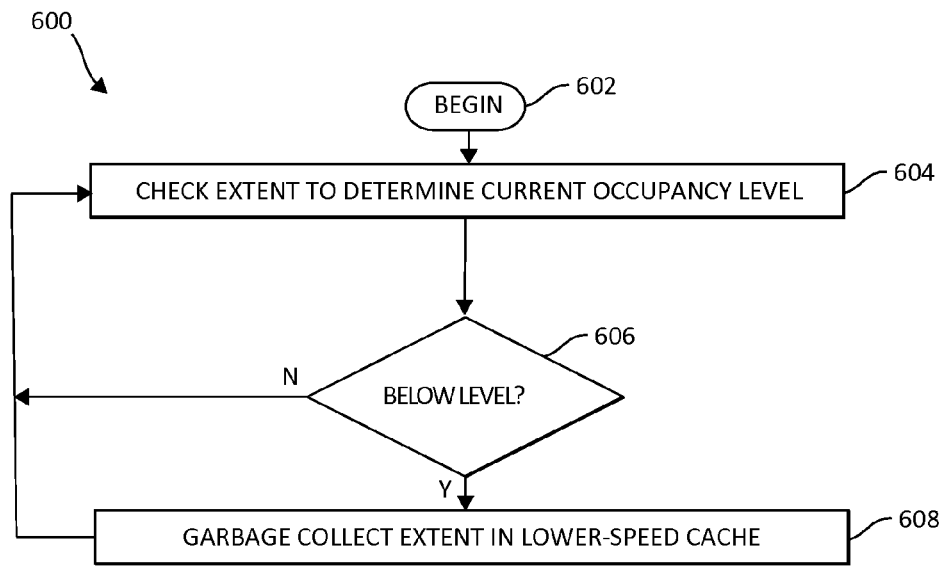
FIG. 6 is a flow chart diagram showing an exemplary method for releasing flash cache space/garbage collection in conjunction with the exemplary methods as shown in FIGS. 4 and 5 previously.

FIG. 6, following, illustrates an exemplary mechanism for space reclamation/garbage collection on Flash Cached data segments, in accordance with the present invention, in order to retain adequate space for data caching and migration over a period of time, for example.

Method 600 begins, (step 602) with the examination of a data segment (e.g., extent) to determine a current occupancy level (step 604). Here again, the relevant size of the extent may vary but in keeping with the previously examples, the extent size may be 1 GB. If the extent is determined to fall below a certain occupancy level (step 606), the extent is garbage collected to free space in the Flash Cache (step 608). Returning to step 606, if the level is not determined to have fallen below the aforementioned occupancy level, the method 600 returns to step 604 to check an additional extent (or perhaps subsequently, the same extent at a later period of time). As one of ordinary skill in the art will appreciate, the occupancy level of a certain extent may decrease in a particular Flash Cache as extents are migrated to the managed tiers of storage, or tracks from the extent are demoted due to a migration policy (e.g., Least Recently Used (LRU)).

As one of ordinary skill in the art will appreciate, various steps in method 500 may be tailored to suit a particular application. In any event, certain data segments may be passed back and forth between the tiered storage and Flash Cache (the lower-speed cache) by for example, once a determination is made that a selected data segment currently in Flash Cache has become uniformly hot, migrating the entire segment to SSD, while not turning the Flash Cache off until the extent is migrated, or once a determination is made that a selected data segment currently in Flash Cache has become sparsely hot, migrating those portions of the segments determined to be sparsely hot to the SSD portion of the tiered storage architecture.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for data processing in a distributed computing storage environment by a processor device, the distributed computing storage environment incorporating at least high-speed and lower-speed caches, and tiered levels of storage, the method comprising:

migrating groups of data segments between the tiered levels of storage such that uniformly hot ones of the groups of data segments and clumped hot ones of the groups of data segments are migrated to use a Solid State Drive (SSD) portion of the tiered levels of storage, determining the uniformly hot groups of data segments using a first heat map for a selected one of the group of the data segments, the heat map having a first, largest granularity;

determining the clumped hot groups of data segments using a second heat map having a granularity smaller than the first, largest granularity of the first heat map; and determining sparsely hot groups of data segments by determining that neither the first heat map nor the second heat map are hotter than a first and second predetermined threshold, respectively.

2. The method of claim 1, further including using the lower-speed cache for a remaining portion of the clumped hot ones, and the sparsely hot ones of the groups of data segments are migrated to use the lower-speed cache while using a lower one of the tiered levels of storage for a remaining portion of the sparsely hot ones.

3. The method of claim 1, further including determining the uniformly hot groups of data segments by determining that first heat map is hotter than the first predetermined threshold.

4. The method of claim 3, wherein determining that the first heat map is hotter than the first predetermined threshold further includes determining that at least a predetermined number of granular portions of the selected one of the group of data segments is hotter than the first predetermined threshold.

5. The method of claim 4, further including determining the clumped hot groups of data segments by determining that the first heat map is not hotter than the predetermined threshold, yet at least a portion of the second heat map is hotter than the second predetermined threshold.

6. The method of claim 1, further including migrating a selected one of the groups of data segments between the SSD portion and the lower-speed cache by:
if the selected group is cached in the lower-speed cache and is determined to become one of uniformly hot and clumped hot, migrating the selected group from the lower-speed cache to the SSD portion while refraining from processing data retained in the lower-speed cache until the selected group is fully migrated to the SSD portion.

7. The method of claim 1, further including migrating a selected one of the groups of data segments between the SSD portion and the lower-speed cache by:
if the selected group is cached in the SSD portion and is determined to become sparsely hot, migrating the selected group from the SSD portion to the lower-speed cache, and subsequently, migrating the selected group from the SSD portion to a Hard Disk Device (HDD).

8. A system for data processing in a distributed computing storage environment, the distributed computing storage environment incorporating at least high-speed and lower-speed caches, and tiered levels of storage, comprising:
a processor device, operable in the computing storage environment, wherein the processor device:
migrates groups of data segments between the tiered levels of storage such that uniformly hot ones of the groups of data segments and clumped hot ones of the groups of data segments are migrated to use a Solid State Drive (SSD) portion of the tiered levels of storage,
determines the uniformly hot groups of data segments using a first heat map for a selected one of the group of the data segments, the heat map having a first, largest granularity,
determines the clumped hot groups of data segments using a second heat map having a granularity smaller than the first, largest granularity of the first heat map, and
determines sparsely hot groups of data segments by determining that neither the first heat map nor the second heat map are hotter than a first and second predetermined threshold, respectively.

9. The system of claim 8, wherein the processor device uses the lower-speed cache for a remaining portion of the clumped hot ones, and the sparsely hot ones of the groups of data segments are migrated to use the lower-speed cache while using a lower one of the tiered levels of storage for a remaining portion of the sparsely hot ones.

10. The system of claim 8, wherein the processor device determines the uniformly hot groups of data segments by determining that first heat map is hotter than the first predetermined threshold.

11. The system of claim 10, wherein the processor device, pursuant to determining that the first heat map is hotter than the first predetermined threshold, determines that at least a predetermined number of granular portions of the selected one of the group of data segments is hotter than the first predetermined threshold.

12. The system of claim 11, wherein the processor device, pursuant to determining the clumped hot groups of data segments, determines that the first heat map is not hotter than the predetermined threshold, yet at least a portion of the second heat map is hotter than the second predetermined threshold.

13. The system of claim 8, wherein the processor device migrates a selected one of the groups of data segments between the SSD portion and the lower-speed cache by:
if the selected group is cached in the lower-speed cache and is determined to become one of uniformly hot and clumped hot, migrating the selected group from the lower-speed cache to the SSD portion while refraining from processing data retained in the lower-speed cache until the selected group is fully migrated to the SSD portion.

14. The system of claim 8, wherein the processor device migrates a selected one of the groups of data segments between the SSD portion and the lower-speed cache by:
if the selected group is cached in the SSD portion and is determined to become sparsely hot, migrating the selected group from the SSD portion to the lower-speed cache, and subsequently, migrating the selected group from the SSD portion to a Hard Disk Device (HDD).

15. A computer program product for data processing in a distributed computing storage environment by a processor device, the distributed computing storage environment incorporating at least high-speed and lower-speed caches, and tiered levels of storage, the computer program product comprising a non-transitory computer-readable storage medium having computer-readable program code portions stored therein, the computer-readable program code portions comprising:
a first executable portion that migrates groups of data segments between the tiered levels of storage such that uniformly hot ones of the groups of data segments and clumped hot ones of the groups of data segments are migrated to use a Solid State Drive (SSD) portion of the tiered levels of storage,
determines the uniformly hot groups of data segments using a first heat map for a selected one of the group of the data segments, the heat map having a first, largest granularity;
determines the clumped hot groups of data segments using a second heat map having a granularity smaller than the first, largest granularity of the first heat map; and
determines sparsely hot groups of data segments by determining that neither the first heat map nor the second heat map are hotter than a first and second predetermined threshold, respectively.

16. The computer program product of claim 15, further including a second executable portion that uses the lower-speed cache for a remaining portion of the clumped hot ones, and the sparsely hot ones of the groups of data segments are migrated to use the lower-speed cache while using a lower one of the tiered levels of storage for a remaining portion of the sparsely hot ones.

17. The computer program product of claim 15, further including a second executable portion that determines the uniformly hot groups of data segments by determining that first heat map is hotter than the first predetermined threshold.

18. The computer program product of claim 17, further including a third executable portion that, pursuant to determining that the first heat map is hotter than the first predetermined threshold, determines that at least a predetermined number of granular portions of the selected one of the group of data segments is hotter than the first predetermined threshold.

19. The computer program product of claim 18, further including a fourth executable portion that, pursuant to determining the clumped hot groups of data segments, determines that the first heat map is not hotter than the predetermined threshold, yet at least a portion of the second heat map is hotter than the second predetermined threshold.

20. The computer program product of claim 15, further including a second executable portion that migrates a selected one of the groups of data segments between the SSD portion and the lower-speed cache by:

if the selected group is cached in the lower-speed cache and is determined to become one of uniformly hot and clumped hot, migrating the selected group from the lower-speed cache to the SSD portion while refraining from processing data retained in the lower-speed cache until the selected group is fully migrated to the SSD portion.

21. The computer program product of claim 15, further including a second executable portion that migrates a selected one of the groups of data segments between the SSD portion and the lower-speed cache by:

if the selected group is cached in the SSD portion and is determined to become sparsely hot, migrating the selected group from the SSD portion to the lower-speed cache, and subsequently, migrating the selected group from the SSD portion to a Hard Disk Device (HDD).

* * * * *